(12) United States Patent (10) Patent No.: US 7,420,373 B2
Reiderman et al. (45) Date of Patent: Sep. 2, 2008

(54) MAGNETIC HEAD FOR CONDUCTIVITY IMAGING FOR USE IN BOREHOLES

(75) Inventors: Arcady Reiderman, Houston, TX (US); David Beard, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/538,935

(22) Filed: Oct. 5, 2006

(65) Prior Publication Data

US 2007/0222453 A1 Sep. 27, 2007

Related U.S. Application Data

(60) Provisional application No. 60/784,164, filed on Mar. 21, 2006.

(51) Int. Cl.
*G01V 3/00* (2006.01)
*G01V 3/18* (2006.01)
*G01R 33/12* (2006.01)

(52) U.S. Cl. .................. 324/333; 324/324; 324/204

(58) Field of Classification Search .............. 324/324, 324/327, 329, 332–346, 204, 228; 175/45; 166/250.01; 340/853.4, 856.1
See application file for complete search history.

(56) References Cited

U.S. PATENT DOCUMENTS

| 2,693,508 | A | * | 11/1954 | Lord | ..................... 360/123 |
| 5,734,535 | A | * | 3/1998 | Nakata et al. | ............... 360/125 |
| 6,815,954 | B2 | | 11/2004 | Iwanicki et al. | |
| 2005/0242819 | A1 | | 11/2005 | Gold et al. | |
| 2006/0022887 | A1 | | 2/2006 | Bittar et al. | |

* cited by examiner

*Primary Examiner*—Reena Aurora
(74) *Attorney, Agent, or Firm*—Cantor Colburn LLP

(57) ABSTRACT

A sensor for performing micro-conductivity measurements during well logging measurements in a borehole includes a magnetic core having a conductive insert wherein windings are driven with alternating current. Some embodiments include a sensor further having a conductive case. Various aspects of the sensor, such as dimensions and conductive properties of fabrication materials are selected to maximize performance of the sensor. Methods for using the sensor call for, among other things, placing the sensor in a well logging tool, and placing the tool in a well bore. A substantial focusing of the magnetic field on the wall of the borehole is achieved and provides for high quality data.

20 Claims, 6 Drawing Sheets

-- PRIOR ART --

MAGNETIC HEAD FOR CONDUCTIVITY IMAGING FOR USE IN BOREHOLES

CROSS REFERENCE TO RELATED APPLICATIONS

Under 35 U.S.C. §119(e), this application claims the benefit of U.S. Provisional Application No. 60/784,164, filed Mar. 21, 2006, the entire disclosure of which is incorporated herein by reference.

BACKGROUND OF THE INVENTION

1. Field of the Invention

The invention is related generally to the field of performing measurements with well logging instruments for the purpose of determining the properties of earth formations. More specifically, the invention provides techniques for making fine measurements of conductivity within a borehole.

2. Description of the Related Art

Electromagnetic induction and wave propagation logging tools are commonly used for determination of electrical properties of formations surrounding a borehole. These logging tools give measurements of apparent resistivity (or conductivity) of the formation that, when properly interpreted, are diagnostic of the petrophysical properties of the formation and the fluids therein.

In thinly laminated sand-shale sequences or shaly-sand formations, the formation electrical anisotropy becomes important in determining the hydrocarbon saturation from the resistivity measurements. Due to the complexity of subterranean formations determining the electrical properties can be complicated. For example, with typical well logging tools, measurements can be imprecise enough that small indications of reserves are overlooked. In some instances, the small indications can lead to significant or substantial findings. Accordingly, it is prudent to investigate small indications.

Investigation of small indications involves micro-conductivity imaging of the wall of a borehole. Prior research has been conducted in this area, and the need for improvements remains. For example, prior art devices implementing the technology are normally based on galvanic excitation and galvanic reading the signal associated with local conductivity of earth formations. One example is provided in U.S. Pat. No. 6,815,954, entitled "Method and Apparatus for Full Offset Resistivity Imaging for Use in Boreholes," issued Nov. 9, 2004 to Iwanicki, et al. This patent makes use of micro-resistivity techniques for obtaining an image of a borehole.

Another approach is disclosed in U.S. Patent Application No. US 2005/0242819, entitled "Compact Magnetic Sensor for Multi-Component Induction and Micro-Resistivity Measurements," published Nov. 3, 2005 and by Gold et al. This application discloses a compact magnetic sensor for use in pad mounted applications and field focusing applications.

Among the various problems with prior art approaches are that galvanic techniques often fail when dealing with a highly conductive formation and low conductive bore mud (oil based mud). Main voltage drop occurs on a low conductive gap (always present) between a button electrode and the formation. The stray electric field and related instability typically causes an unacceptable measurement error as a result.

Other techniques for evaluation of the conductivity of the formation involve probing with an induction-sensing coil that generates an AC magnetic field and corresponding eddy currents in the wall of the borehole. In these embodiments, the induction sensors typically have problems with signal localization and poor sensitivity for variations of the wall conductivity due to poor energy focusing on the spot of interest.

There is a need for advanced methods for providing meaningful results from micro-conductivity evaluations of the walls of a borehole. Preferably, the methods should consistently provide accurate and reliable data and be computationally efficient.

BRIEF SUMMARY OF THE INVENTION

Disclosed is a magnetic sensor adapted for making micro-conductivity measurements in a borehole, the sensor including: a magnetic core supporting windings wound around portions thereof and at least one conductive insert disposed within a core gap of the magnetic core wherein the windings are adapted for receiving a current and providing measurement data for the measurements.

Also disclosed is a magnetic sensor adapted for making micro-conductivity measurements in a borehole, the sensor including: a magnetic core including an inner conductor disposed within a core gap thereof, the magnetic core being comprised within an outer conductor, wherein, a combination of the inner conductor and the outer conductor effectively form a single-turn winding adapted for generating a magnetic field of the magnetic sensor.

Further disclosed is a tool for performing micro-conductivity measurements in a borehole, the tool including: a magnetic sensor including a magnetic core supporting windings wound around portions thereof and at least one conductive insert disposed within a core gap of the magnetic core wherein the windings are adapted for receiving a current and providing measurement data for the measurements.

Additionally, a method for performing micro-conductivity measurements in a borehole, is provided and includes: selecting a tool including at least one magnetic sensor including a magnetic core supporting windings wound around portions thereof and at least one conductive insert disposed within a core gap of the magnetic core wherein the windings are adapted for receiving a current and providing measurement data for the measurements; and, performing micro-conductivity measurements with the tool in the borehole.

Also provided is a method for fabricating a magnetic sensor adapted for making micro-conductivity measurements in a borehole, the method including: selecting components for the sensor including at least one magnetic core, at least one conductive insert, at least one set of windings and optionally at least one conductive case; determining aspects of the components for maximizing performance of the magnetic sensor for making the micro-conductivity measurements; assembling the components so that the magnetic core includes windings wound around portions thereof, the magnetic core also including at least one conductive insert disposed within a core gap of the magnetic core.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several Figures.

DETAILED DESCRIPTION OF THE INVENTION

Figure 1:
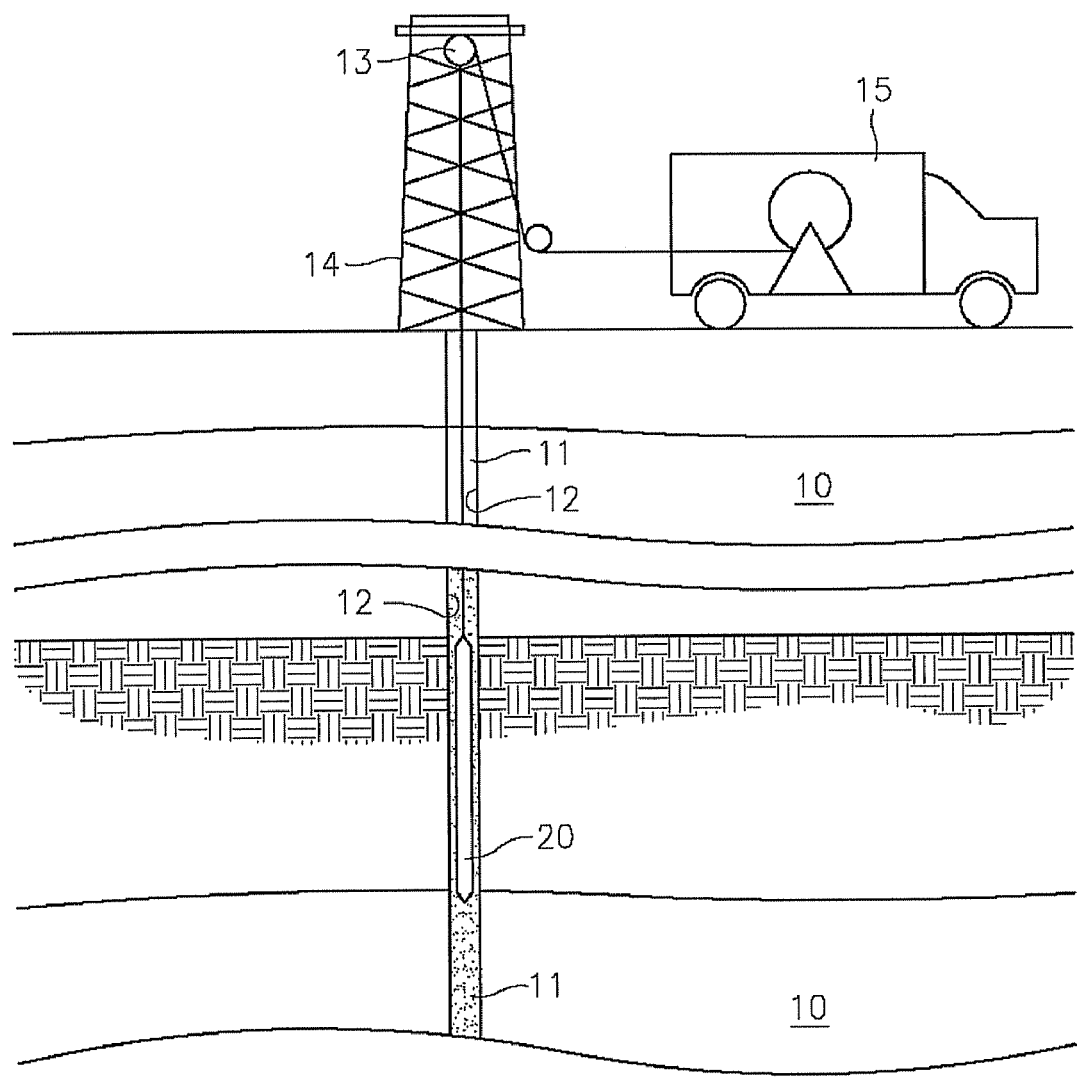
FIG. 1 depicts aspects of well logging and a sampling tool.

Referring to FIG. 1, a cross-section of earth 10 along the length of a penetration referred to as a "borehole" 11 is depicted. Usually, the borehole 11 is at least partially filled with a mixture of liquids including water, drilling fluid, and formation fluids that are indigenous to the earth formations penetrated by the borehole 11. Suspended within the borehole 11 at the bottom end of a wireline 12 is a formation fluid sampling tool 20. The wireline 12 is often carried over a pulley 13 supported by a derrick 14. Wireline 12 deployment and retrieval is typically performed by a powered winch carried by a service truck 15.

Figure 2:
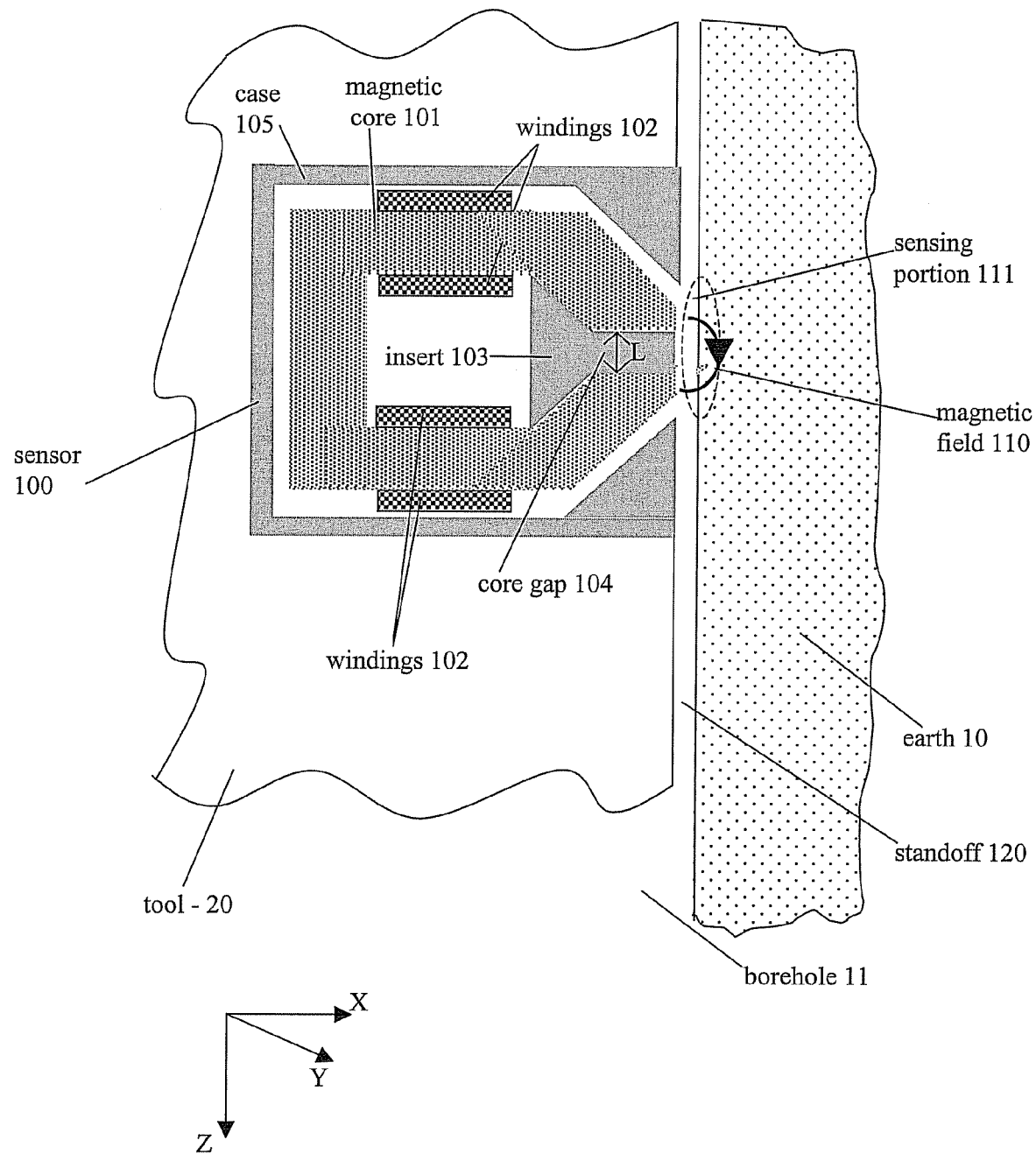
FIG. 2 depicts aspects of a sensor for micro-conductivity measurements.

In general, a coordinate system for describing a location of the sampling tool 20 includes a Z-axis, a Y-axis and a X-axis. In the embodiments depicted, the Z-axis describes a vertical component of the coordinate system. Reference may be had to FIG. 1 through FIG. 3 regarding the coordinate system.

Numerous embodiments of sampling tools are known. One non-limiting example of the tool 20 is the 3 DExplorer™ tool, which is an induction logging instrument produced by Baker Hughes of Houston, Tex. More information regarding the 3 Dexplorer™ tool may be had by turning to the paper "A new Multicomponent Induction Logging Tool to Resolve Anisotropic Formations" by Kriegshäuser, et al, SPWLA 41$^{st}$ Annual Logging Symposium, Jun. 4-7, 2000, the disclosure of which is incorporated by reference herein in its entirety.

The 3 Dexplorer™ as well as numerous other tools useful for subterranean measurements make use of various supporting structures, mechanisms and methods for execution of desired tasks. For example, the 3 Dexplorer™ makes use of electronics and processing capabilities for detecting and interpreting a signal from the 3 Dexplorer™. As these supporting structures, mechanisms and methods are generally not a part of the teachings herein, but considered relevant, these aspects are not discussed in any particular greater depth herein. It suffices to say that the teachings disclosed herein may be used in conjunction with tools such as the 3 Dexplorer™ and numerous other tools useful for subterranean measurements. Further, the teachings herein may take advantage of aspects of other supporting structures, mechanisms and methods as may be included with such other tools. One skilled in the art can surmise many techniques and advantages of the integration of the teachings herein with such other tools.

In order to overcome present limitations in micro-conductivity (i.e., resistivity) measurements, an improved magnetic sensor and techniques for use thereof are disclosed.

In an illustrative and non-limiting embodiment, and with reference to FIG. 2, a magnetic sensor 100 is disposed within the sampling tool 20. The sensor 100 is situated such that an interface of the sensor 100 is exposed to the borehole 11 within the formations of earth 10. The sensor 100 includes a conductive case 105 that houses a C-shaped magnetic core 101 having windings 102 around parallel portions (upper and lower portions) of the C-shape. A core gap 104 of the C-shaped magnetic core 101 is filled with a conductive insert 103. Typically, the conductive insert 103 is in substantial contact with the upper and lower parallel portions of the C-shaped magnetic core 101. In this embodiment, the conductive insert 103 is fabricated from copper. Likewise, the conductive case 105 is fabricated from copper. In other embodiments conductive materials such as copper alloys are used. Accordingly, the use of copper herein is merely illustrative and not limiting. The magnetic core 101 is typically made of a soft magnetic ferrite material providing for high frequency operation.

The windings 102 are electrically coupled to a source of alternating current (AC, not shown) and driven by the AC. Once the sensor 100 is energized, a magnetic field 110 is generated. The windings 102 provide a measurement signal as output that is descriptive of fine measurement data from within the wall of the borehole 11 (i.e., the surface and near surface of earth 10 present in the borehole 11).

Typically, a length L of the core gap 104 is chosen to be between about one times and about two times a standoff distance S 120 between a sensing portion 111 (roughly depicted in FIG. 2) of the sensor 100 and the wall of the borehole 11. The standoff 120 is typically about ¼ of an inch. Although the sensing portion 111 is depicted in FIG. 2 as a region within an oval, the reach of the magnetic field is better depicted in FIG. 3.

Figure 3A:
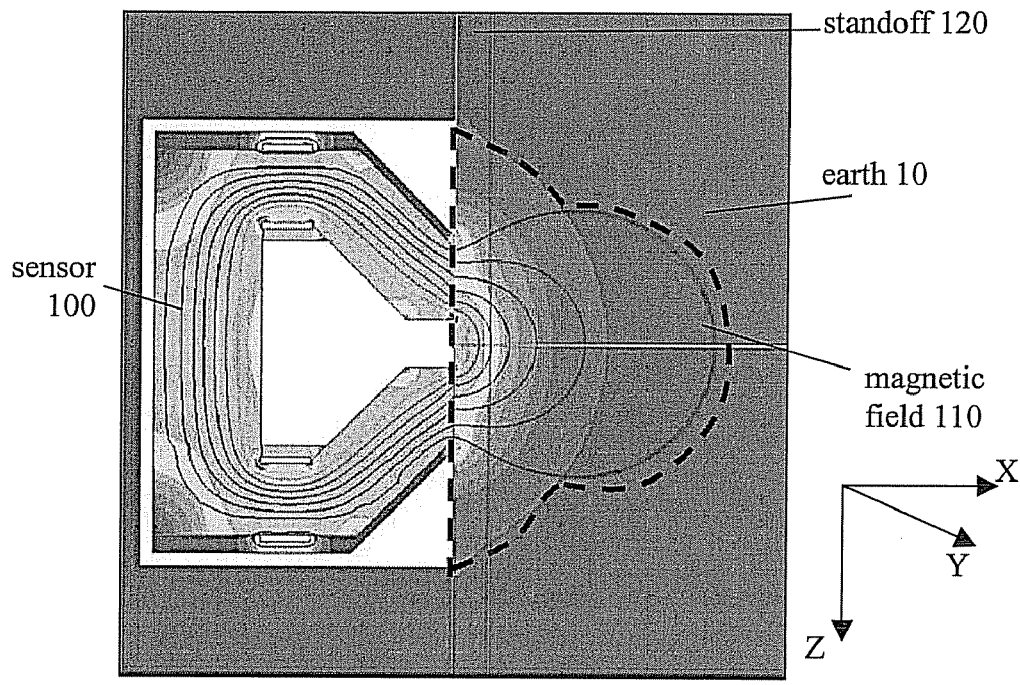
FIG. 3A and FIG. 3B, collectively referred to as FIG. 3, depict aspects of performance of the sensor disclosed herein.
Figure 3B:
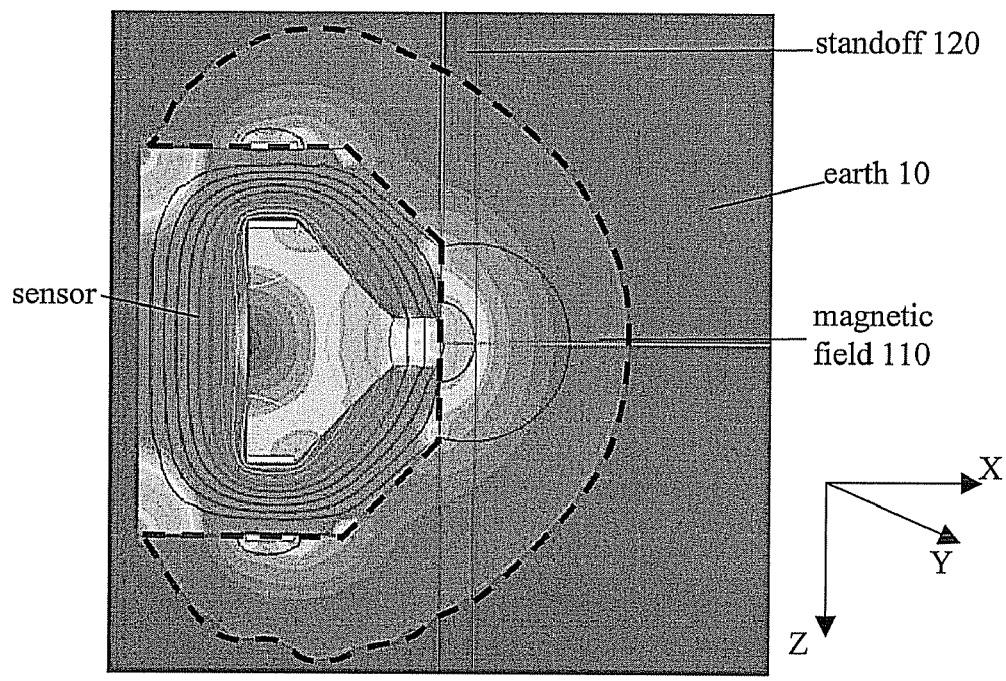

FIG. 3A and FIG. 3B, collectively referred to as FIG. 3, depicts, in a two dimensional model, a distribution of the magnetic field from operation of the sensor 100. The effect of using the conductive insert 103 and conductive case 105 is illustrated in FIG. 3. In FIG. 3A, the conductive insert 103 and the conductive case 105 are fabricated from copper. The prior art sensor of FIG. 3B does not include the conductive insert 103 and the conductive case 105. The magnetic field focusing effect in the sensor of FIG. 3B is achieved by, among other things, the shape of the magnetic core that focuses a substantial part of the magnetic field 110.

Referring to FIGS. 3A and 3B, the magnetic field 110 is generally delineated by a heavy dashed line. The side-by-side depiction provided makes it clear that the sensor 100 designed in accordance with the teachings herein, provides for a greater focused magnetic field 110, providing substantial improvements over the prior art.

More specifically, a substantial focusing of the magnetic field 110 on the wall spot of the borehole 11 is achieved. The focusing of the magnetic field 110 can be described using the following two parameters: vertical resolution $R_v$ and a sensor quality factor Q. The vertical resolution $R_v$ is a parameter defining an effective sensitive region along the Z-axis. Typically, the vertical resolution $R_v$ is expressed such that smaller values represent improvements in imaging results. The sensor 100 (represented as an inductor) has a sensor quality factor Q that is dependant upon, among other things, electromagnetic losses in the windings 102, losses in the magnetic core 101 and losses due to coupling with the conductive wall of the borehole 11. Better focusing of the magnetic field 110 on the spot of interest results in more losses induced by the conductive wall and therefore increased sensitivity of the sensor 100. Thus, for a given loss in the windings 102 and the magnetic core 101, the lower the sensor quality factor Q the better the sensitivity to the local resistivity of the wall of the borehole 11.

The sensor quality factor Q was estimated for 20 MHz frequency and 1 Ohm·m resistivity of the wall of the borehole 11. The prior art sensor depicted in FIG. 3B achieved vertical resolution $R_v$ of 22 mm and a sensor quality factor Q of 107. The sensor 100 depicted in FIG. 3A, and constructed in accordance with the teachings herein, achieved vertical resolution $R_v$ of 15 mm and a sensor quality factor Q of 85.

The sensor quality factor Q would be about 300 for a current loop having vertical resolution $R_v$ of about 15 mm. The substantially higher quality factor Q for the current loop (compared to that of the magnetic head of the present invention) means that without the focusing effect provided, the energy loss introduced by a conductive spot in wall of the borehole 11 is substantially smaller and therefore the current loop is less sensitive to conductivity in the wall of the borehole 11.

By measuring an apparent sensor quality factor Q for the sensor 100, assessment of local conductivity in the wall of the borehole 11 can be performed. Measurement of the sensor quality factor Q is typically performed by analyzing a signal generated in the sensor windings. Variations in the sensor quality factor Q (for example, due to coupling of the sensor 100 with the wall of the borehole 11) may be small compared to a background signal that is generated in the windings 102 without the coupling. In some cases, instability of a background signal may cause an error in measurement of the sensor quality factor Q. Accordingly, it is typically advantageous to eliminate background signals.

Figure 4:
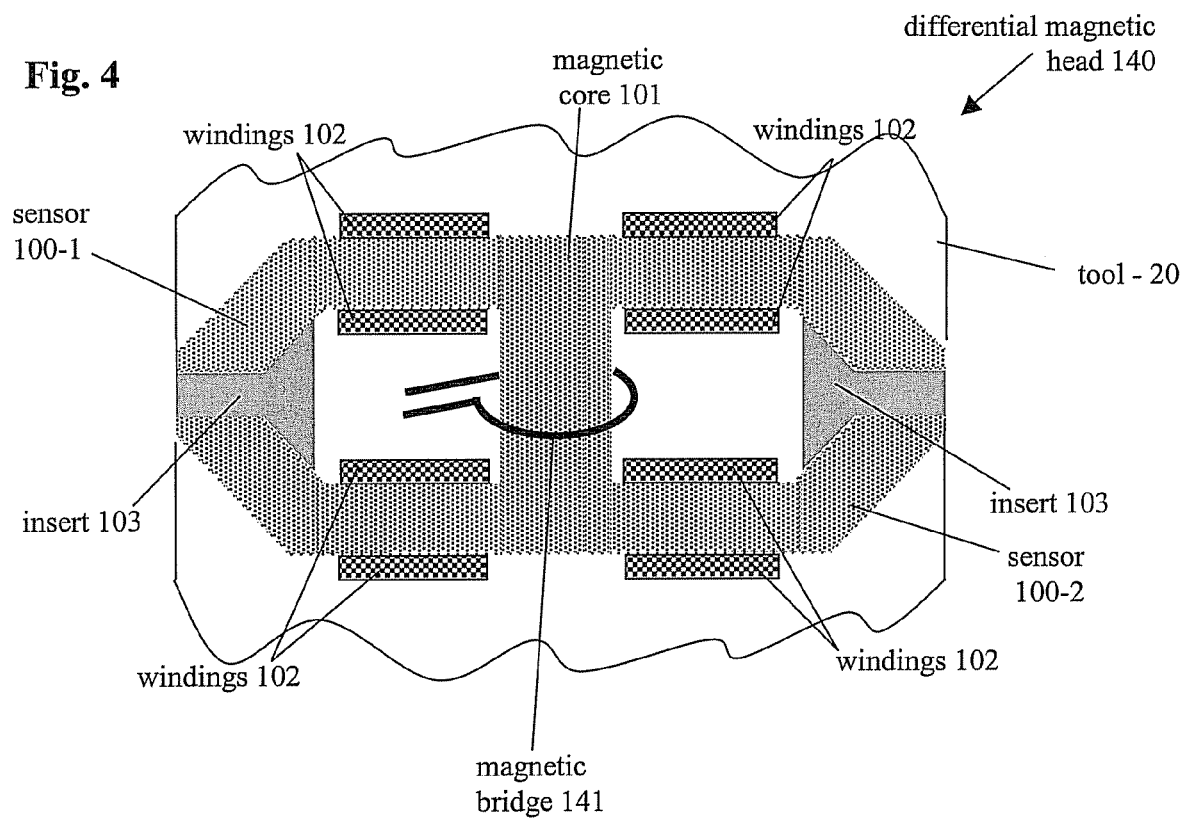
FIG. 4 depicts aspects of a sensor having a differential magnetic head.

In order to minimize the background signal in the absence of conductive medium near the magnetic head gap region, a differential magnetic head can be used. One embodiment of the differential magnetic head (also referred to as a magnetic bridge) is depicted in FIG. 4 (the conductive case is not shown in the FIG. 4). In FIG. 4, the differential magnetic head 140 includes a diagonal coil 141 disposed around a diagonal 142. Note that in FIG. 4, the conductive case 105 is not depicted. However, as one might imagine, in this embodiment, the conductive case 105 may include multiple cases (e.g., a segmented conductive case 105).

As an example, and for simplicity, it may be considered that the differential magnetic head 140 includes a first sensor 100-1 and a second sensor 100-2. In typical embodiments using the differential magnetic head 140, a signal from the first sensor 100-1 is compared with another signal from the second sensor 100-2 by measuring a voltage on the diagonal coil 141. In this manner, noise and other aspects of measurement data may be analyzed and accounted for in the results.

Figure 5:
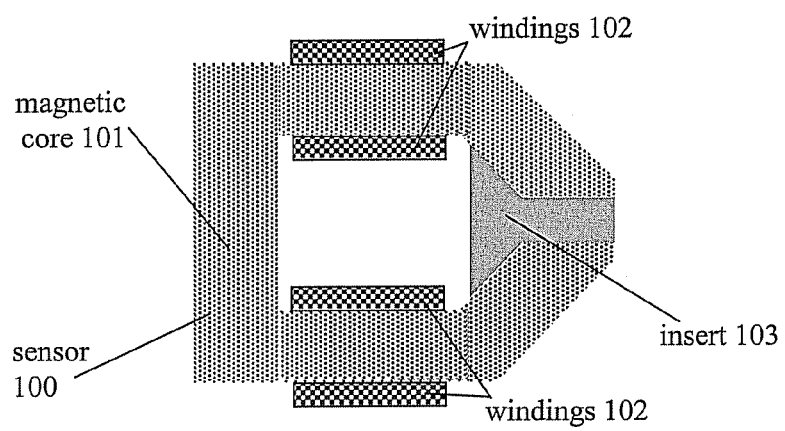
FIG. 5 depicts aspects of a sensor for use with DC.

FIG. 5 depicts another embodiment of the sensor 100 (the conductive case is not shown in FIG. 5). In this embodiment, a source of direct current (DC) is connected to the sensor windings and a signal is generated and detected by laterally translating (i.e., vibrating). Substantially no signal is generated by the vibrating assembly, unless a conductive medium near the magnetic head gap area is present (i.e., in the wall of the borehole 11).

Figure 6:
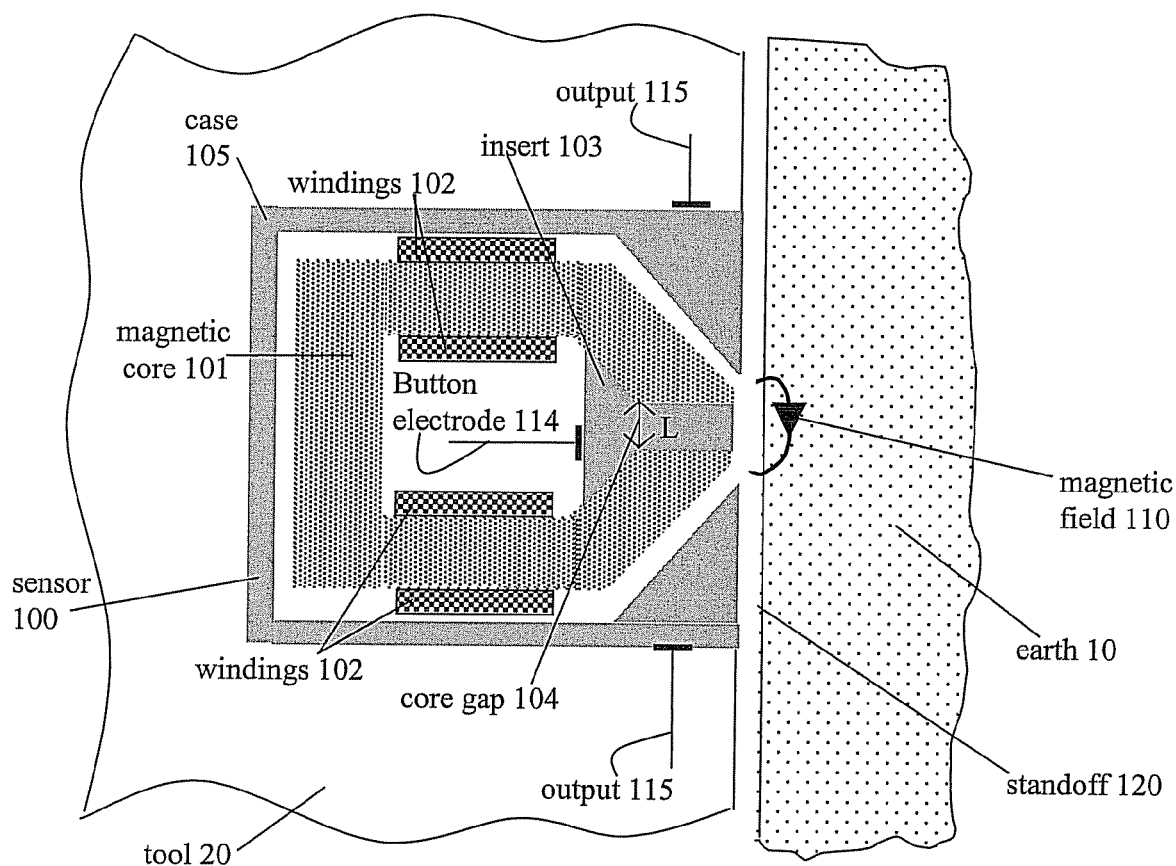
FIG. 6 depicts aspects of the sensor with a button electrode included therein; and, FIG. 7 depicts aspects of the sensor having a conductive insert and a conductive case combined with sensor windings.

A further embodiment of the present disclosure is a combined sensor depicted in FIG. 6. In this embodiment, the conductive insert 103 also serves as a button electrode 114 for use as at least one of a galvanic transmitter and receiver. A second electrode 115 can be coupled to the conductive case 105. The electrodes 114 and 115 provide galvanic signals that can be effectively used to cover the whole spectrum of possible practical situations from highly conductive bore mud and low conductivity formation (a suitable situation for a galvanic sensor) to low conductivity bore mud and high conductivity formation (a preferable condition for an induction sensor).

Figure 7:
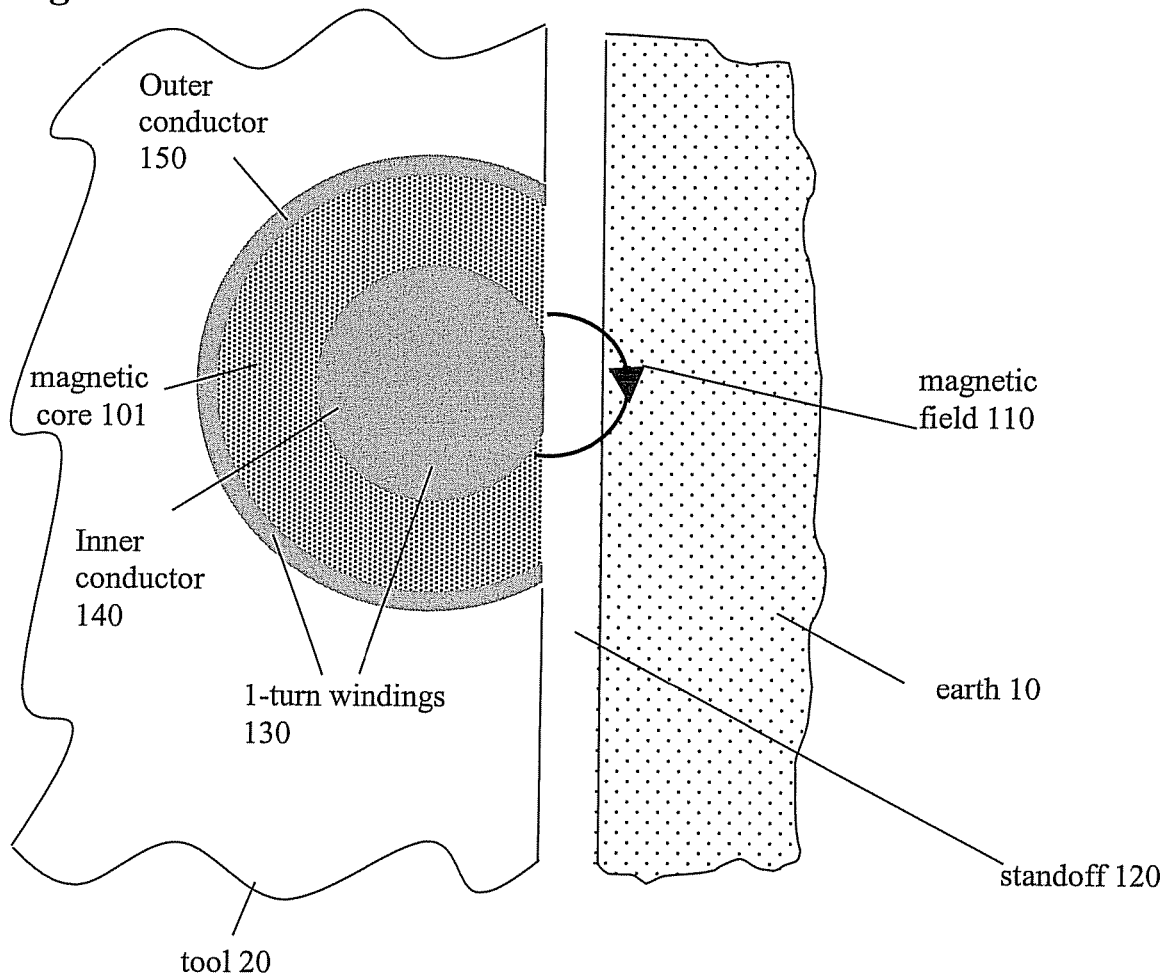

Yet another embodiment of the present invention includes a magnetic head where the conductive insert 103 and the conductive case 105 are combined with the windings 102. An exemplary embodiment is depicted in FIG. 7. In this example, an inner conductor 140 and an outer conductor 150 male single-turn windings 130. The inner conductor 140 and the outer conductor 150 serve as the conductive insert 103 and the conductive case 105, thus further directing a magnetic field 110 of the sensor 100 toward the wall of the borehole 11.

In other embodiments, the various features of the sensor 100 may be modified as considered desirable. For example, in other embodiments, at least one of the insert 103 and the magnetic core 101 exhibit shapes, sizes and relationships not depicted herein. Accordingly, one skilled in the art will recognize that the various designs for the sensor 100 that include the insert 103 and the magnetic core 101 and may include the conductive case 105 are within the teachings of this disclosure and described by the appended claims.

Typically, dimensions of components of the sensor 100 are chosen to maximize (as an inductor) an intrinsic sensor quality factor Q (without coupling with the conductive wall). Typically, material for the magnetic core 101 is chosen with a similar regard for low electromagnetic losses in the range of operating frequencies. That is, the sensor quality factor Q, the magnetic core 101 and other aspects of the sensor 100 are typically chosen to maximize an operational aspect (such as the magnetic field 110) of the sensor 100.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for making micro-conductivity measurements in a borehole, the apparatus comprising:
    a formation fluid sampling tool; and
    a sensor disposed within the tool, the sensor comprising a magnetic core supporting windings wound around portions thereof and at least one conductive insert disposed within a core gap of the magnetic core wherein the windings are adapted for receiving a current and providing measurement data for the measurements.

2. The magnetic sensor of claim 1, being comprised within at least one conductive case.

3. The magnetic sensor of claim 2, wherein at least one of the conductive insert and the conductive case are fabricated from one of copper and a copper alloy.

4. The magnetic sensor of claim 1, wherein the magnetic core comprises a soft magnetic ferrite material.

5. The magnetic sensor of claim 1, wherein the magnetic core comprises a shape for focusing a magnetic field of the sensor.

6. The magnetic sensor of claim 1, wherein the magnetic core comprises a C-shape.

7. The magnetic sensor of claim 6, wherein the windings are wound around parallel portions of the C-shape.

8. The magnetic sensor of claim 1, wherein the windings are adapted for coupling to a source of alternating current (AC).

9. The magnetic sensor of claim 1, wherein the windings are adapted for coupling to a source of direct current (DC) and the sensor is adapted for operation by at least one of a lateral translation and a vibration.

10. The magnetic sensor of claim 1, wherein a length L of the core-gap is between about one times and about two times a standoff distance S between a sensing portion of the sensor and a wall of a borehole into which the logging tool is inserted.

11. The magnetic sensor of claim 1, wherein a first conductive insert is disposed opposite to a second conductive insert and is adapted for providing a magnetic bridge.

12. The magnetic sensor of claim 1, further comprising a button electrode coupled to the conductive insert and is adapted for use as at least one of a galvanic transmitter and receiver.

13. The magnetic sensor of claim 12, further comprising an electrode coupled to the conductive case for providing galvanic signals.

14. The magnetic sensor of claim 1, wherein the sensor comprises at least one of a design and a construction for maximizing an operational aspect of the sensor.

15. A method for performing micro-conductivity measurements in a borehole, comprising:
   selecting a formation fluid sampling tool comprising at least one magnetic sensor disposed within the tool, the sensor comprising a magnetic core supporting windings wound around portions thereof and at least one conductive insert disposed within a core gap of the magnetic core wherein the windings are adapted for receiving a current and providing measurement data for the measurements; and,
   performing micro-conductivity measurements with the tool in the borehole.

16. The method of claim 15, wherein performing comprises using a differential magnetic head of the tool to obtain a first signal and another signal.

17. The method of claim 16, wherein the measurements comprise a comparison of the first signal and the another signal.

18. The method as in claim 15, wherein performing comprises applying an alternating current (AC) signal to the windings.

19. The method as in claim 15, wherein performing comprises applying direct current (DC) signal to the windings and at least one of laterally translating the sensor and vibrating the sensor.

20. The method as in claim 19, wherein each one of translating and vibrating provides for at least one of generating a signal and detecting a signal.

* * * * *